(12) United States Patent
Cassidy et al.

(10) Patent No.: US 7,073,588 B2
(45) Date of Patent: Jul. 11, 2006

(54) ESTERQUAT ACIDIC SUBTERRANEAN TREATMENT FLUIDS AND METHODS OF USING ESTERQUATS ACIDIC SUBTERRANEAN TREATMENT FLUIDS

(75) Inventors: Juanita M. Cassidy, Duncan, OK (US); Jim L. Lane, Duncan, OK (US); Chad E. Kiser, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 215 days.

(21) Appl. No.: 10/789,315

(22) Filed: Feb. 27, 2004

(65) Prior Publication Data

US 2005/0189113 A1   Sep. 1, 2005

(51) Int. Cl.
*E21B 43/27* (2006.01)

(52) U.S. Cl. ............... 166/307; 166/310; 166/371; 166/902; 507/240; 507/241; 507/244; 507/246; 507/934

(58) Field of Classification Search ............ 507/240, 507/241, 244, 246, 260, 267, 277, 934; 166/307, 166/310, 371, 902
See application file for complete search history.

(56) References Cited

U.S. PATENT DOCUMENTS

| | | | | | |
|---|---|---|---|---|---|
| 2,759,975 | A | * | 8/1956 | Chiddix et al. | 507/240 |
| 2,935,474 | A | * | 5/1960 | Kirkpatrick et al. | 507/240 |
| 3,169,113 | A | * | 2/1965 | Kirkpatrick et al. | 507/240 |
| 3,773,465 | A | * | 11/1973 | Keeney et al. | 422/12 |
| 3,779,935 | A | * | 12/1973 | McDougall et al. | 510/259 |
| 4,343,720 | A | * | 8/1982 | Quinlan | 507/240 |
| 4,552,672 | A | | 11/1985 | Walker | 507/240 |
| 5,034,140 | A | * | 7/1991 | Gardner et al. | 507/244 |
| 5,058,678 | A | * | 10/1991 | Dill et al. | 166/279 |
| 5,120,471 | A | * | 6/1992 | Jasinski et al. | 252/389.54 |
| 5,135,668 | A | * | 8/1992 | Larsen | 507/240 |
| 5,627,144 | A | | 5/1997 | Urfer et al. | 507/211 |
| 5,779,938 | A | * | 7/1998 | Naraghi et al. | 252/391 |
| 6,540,943 | B1 | * | 4/2003 | Treybig et al. | 252/391 |
| 6,762,154 | B1 | * | 7/2004 | Lungwitz et al. | 507/131 |
| 6,866,797 | B1 | * | 3/2005 | Martin et al. | 252/389.23 |

OTHER PUBLICATIONS

"Novel New Ester Quaternaries for Improved Performance Benefits as Rinse Cycle Fabric Softeners," F.E. Friedli, et al., American Oil Chemists' Society Annual Meeting and Expo, Orlando, FL, May 1999.

"Arrhenius Parameters for the Acid Hydrolysis of Esters in Aqueous Solution," Margaret Robson Wright, Journal of The Chemical Society, Section B, Physical Organic Chemistry, 1969.

"Cleavable Surfactants," Maria St. Jerndahl, et al., Novel Surfactants Preparation, Applications, and Biodegradability Second Edition, Revised and Expanded, editor Krister Holmberg, , pp. 317-345.

"Esterquats," Cor Overkempe, et al., Novel Surfactants Preparation, Applications, and Biodegradability Second Edition, Revised and Expanded, editor Krister Holmberg, , pp. 347-384.

* cited by examiner

*Primary Examiner*—George Suchfield
(74) *Attorney, Agent, or Firm*—Robert A. Kent; Baker Botts

(57) ABSTRACT

The present invention relates to acidic treatment fluids that comprise an acid fluid and an ester-containing quaternary ammonium compound ("esterquat") and methods of their use. One embodiment of the present invention provides a method of inhibiting metal corrosion during a subterranean treatment operation comprising using an acidic treatment fluid comprising an acidic fluid and an esterquat. Another embodiment of the present invention provides a method of reducing sludge formation during a subterranean treatment operation formation comprising the step of using an acidic treatment fluid comprising an acidic fluid and an esterquat. Another embodiment of the present invention provides a method of inhibiting the formation of emulsions during a subterranean treatment operation comprising using an acidic treatment fluid comprising an acidic fluid and an esterquat. Another embodiment of the present invention provides an acidic subterranean treatment fluid comprising an acidic fluid and an esterquat.

23 Claims, No Drawings

ESTERQUAT ACIDIC SUBTERRANEAN TREATMENT FLUIDS AND METHODS OF USING ESTERQUATS ACIDIC SUBTERRANEAN TREATMENT FLUIDS

BACKGROUND OF THE INVENTION

The present invention relates to methods and compositions for using acidic treatment fluids that comprise an acid fluid and an ester-containing quaternary ammonium compound ("esterquat"). More particularly, the present invention relates to methods of using such acidic treatment fluids in acidic subterranean treatments as corrosion inhibitors, sludge reducers, and compounds capable of inhibiting the formation of emulsions or reducing the existence of emulsions.

Acidic treatment fluids are commonly used in subterranean operations. One such acidic operation is an acidizing stimulation treatment in which subterranean formations are treated with acid fluids to stimulate the production of hydrocarbons. Such acid stimulation treatments often may be carried out as "matrix acidizing" processes or as "fracture acidizing" processes. In typical matrix acidizing processes, an acidizing treatment fluid is injected from the well bore into the formation at a rate and pressure below that which is sufficient to create a fracture therein. The acid permeates into formation pores and dissolves materials that clog or constrict them, thereby hopefully increasing the formation's permeability. In fracture acidizing, an acidizing treatment fluid is injected into the subterranean formation at a pressure sufficient to create or enhance at least one fracture therein. In such operations, the permeability of the formation may be enhanced. Using acidic treatment fluids in subterranean operations is sometimes problematic. Three primary problems often encountered with the use of acid fluids are equipment corrosion, undesirable emulsion formation, and sludge formation.

Corrosion can act to greatly limit the life of subterranean equipment, piping, and casing materials. Moreover, metal corrosion can increase the level of heavy metals in fluids transmitted through the corroded equipment, potentially increasing the environmental impact of those fluids when they are disposed of or further processed. The expense associated with repairing or replacing corrosion damaged metal tubular goods and equipment can be very high. In a well treatment using an aqueous acid solution, the corrosion of metal surfaces in tubular goods and equipment may result in at least the partial neutralization of the aqueous acid solution before it reacts with acid-soluble materials in the subterranean formation to be treated, which is undesirable. Also, if crude oil should contact the dissolved metals in the acid fluids, precipitation of insoluble sludge may result that can severely damage the permeability of the subterranean formation.

Acids may react with oils in the formation and form insoluble films, the coalescence of which creates "sludge." Typically, such sludge includes asphaltenes, resins, paraffins, and other complex hydrocarbons. Additionally, oil and aqueous fluids used in the well (including any acidizing fluids) may form emulsions that undesirably increase the viscosity of the fluid, and thereby increase the power required to pump the oil to the surface. Moreover, the produced hydrocarbons and the acid must generally be separated for sale, and where an emulsion has formed such separation may be more difficult.

A variety of corrosion inhibiting, anti-sludge, and anti-emulsion formulations for use in acid fluids have been developed and used successfully. Many of such corrosion inhibiting formulations have included quaternary ammonium compounds ("quats") as essential components, particularly in high temperature applications. Quats bear a positive charge and, therefore, effectively coat a negatively charged layer of a metallic surface. However, because of environmental concerns their usage is being curtailed.

Ester-containing normal quaternary ammonium compounds ("esterquats") have been developed in recent years for use as ecologically friendly surfactants in the personal care products, as detergents, and fabric softeners. Esterquats have been shown useful in reducing corrosion and sludge and in inhibiting the formation or reducing the existence of emulsions in personal care products. These compounds are easily biodegraded in alkaline environments and exhibit low fish toxicity upon degradation. For at least these reasons, they have largely replaced alkyl quats in the detergent industry.

SUMMARY OF THE INVENTION

The present invention relates to methods and compositions for using acidic treatment fluids that comprise an acid fluid and an ester-containing quaternary ammonium compound ("esterquat"). More particularly, the present invention relates to methods of using such acidic treatment fluids in acidic subterranean treatments as corrosion inhibitors, sludge reducers, and compounds capable of inhibiting the formation of emulsions or reducing the existence of emulsions.

One embodiment of the present invention provides a method of inhibiting metal corrosion during a subterranean treatment operation comprising using an acidic treatment fluid comprising an acidic fluid and at least one esterquat.

Another embodiment of the present invention provides a method of reducing sludge formation during a subterranean treatment operation formation comprising the step of using an acidic treatment fluid comprising an acidic fluid and at least one esterquat.

Another embodiment of the present invention provides a method of inhibiting the formation of emulsions during a subterranean treatment operation comprising using an acidic treatment fluid comprising an acidic fluid and at least one esterquat.

Another embodiment of the present invention provides an acidic subterranean treatment fluid comprising an acidic fluid and an esterquat.

Other and further features and advantages of the present invention will be readily apparent to those skilled in the art upon a reading of the description of preferred embodiments which follows.

DESCRIPTION OF THE PREFERRED EMBODIMENTS

The present invention relates to methods and compositions for using acidic treatment fluids that comprise an acid fluid and an ester-containing quaternary ammonium compounds ("esterquat"). More particularly, the present invention relates to methods of using such acidic treatment fluids in acidic subterranean treatments as corrosion inhibitors, sludge reducers, and compounds capable of inhibiting the formation of emulsions or reducing the existence of emulsions.

The compositions and methods of the present invention generally comprise an acidic treatment fluid that itself comprises an acid fluid and an esterquat. The acidic treatment fluids of the present invention generally have a pH of less than about 6. Both normal esterquats, and "reverse" esterquats are suitable for use in the present invention. The term "normal esterquat" refers to a compound wherein an ammonium nitrogen is linked through the oxygen of the ester bond. The term "reverse esterquats" refers to a compound wherein a quaternary ammonium group is linked through the carbonyl carbon.

Esterquats have been shown to be biodegradable in that they degrade into compounds that are relatively nontoxic to aquatic organisms. Both normal and reverse esterquats have been found to be relatively stable at low pH values due, inter alia, to charge repulsion between the positively charged nitrogen atom and the carbonyl carbon. When exposed to higher pH values, generally greater than about 6, esterquats begin to degrade at an accelerated rate because, inter alia, the strongly electron withdrawing quaternary ammonium group promotes hydroxyl attack. For at least these reasons, these molecules may be well suited for use in acid environments, e.g., as components in corrosion inhibitors, sludge reducers, and emulsion reducers. They may be particularly well suited because they degrade when pH increases. Normal esterquats are usually suitable for use in acid fluids having a pH from about 0 to about 6; reverse esterquats are usually suitable through that range and may be further suitable for use in fluids having a pH below 0.

Normal esterquats suitable for use in the present invention have the general formula:

$\{R_{(4-m)}N^+.[(CH_2)_n.O.C(O)]_p.R'\}_m.pX^-$, wherein

R represents a linear or branched chain saturated or unsaturated aliphatic hydrocarbon, aryl, arylalkyl, alkyl amide, hydroxy alkyl, or a mixture thereof. Where there is more than one R group (as many as 3), they may be the same as one another or each may be different from the others;

m is an integer in the range from 1 to 3;

p is an integer of at least 1;

R' represents a linear or branched chain saturated or unsaturated aliphatic hydrocarbon, aryl, arylalkyl, alkyl amide, or a mixture thereof;

n is an integer in the range from 1 to 6; and $X^-$ represents an anionic counter ion, examples of which include, but are not limited to, a halide, sulfate, methosulfate, or methophosphate;

Reverse esterquats suitable for use in the present invention have the general formula:

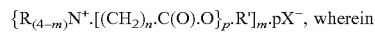

$\{R_{(4-m)}N^+.[(CH_2)_n.C(O).O]_p.R'\}_m.pX^-$, wherein

R represents a linear or branched chain saturated or unsaturated aliphatic hydrocarbon, aryl, arylalkyl, alkyl amide, hydroxy alkyl, or a mixture thereof. Where there is more than one R group (as many as 3), they may be the same as one another or each may be different from the others;

m is an integer in the range from 1 to 3;

p is an integer of at least 1;

R' represents a linear or branched chain saturated or unsaturated aliphatic hydrocarbon, aryl, arylalkyl, alkyl amide, or a mixture thereof;

n is an integer in the range from 1 to 6; and $X^-$ represents an anionic counter ion, examples of which include, but are not limited to, a halide, sulfate, methosulfate, or methophosphate.

In some embodiments of the present invention, R further comprises a substituent group. For example, suitable substituent groups include an aryl group (e.g., a phenyl group), an alkoxy group (e.g., a methoxy or ethoxy group), a hydroxyl group, an aryloxy group (e.g., a phenoxy group), an amido group, or combinations thereof.

Also, in some embodiments of the present invention, the group R' further comprises substitutions by a hydroxyl group, a carbonyl group, an amido group, an aryl group, a sulfur, or combinations thereof. In other exemplary embodiments of the present invention, methyl groups in R' may be substituted by formyl groups, amide groups, or combinations thereof. In yet other exemplary embodiments of the present invention, carbon-carbon double bonds of R' may be substituted by epoxy groups.

Some methods and compositions of the present invention comprise combining suitable esterquats with non-ionic, cationic or anionic surfactants that act, inter alia, to facilitate dispersion of the esterquats in the acidic treatment fluids. Any non-ionic, cationic or anionic surfactant compatible with the esterquat may be used in conjunction with the compositions and methods of the present invention. Suitable non-ionic surfactants include, but are not limited to, alkyoxylates, alkylphenols, ethoxylated alkyl amines, ethoxylated oleates, tall oils, ethoxylated fatty acids, and combinations thereof. Suitable cationic surfactants include, but are not limited to alkylamine oxides and alkylammonium salts. Suitable anionic surfactants include, but are not limited, to α-sulfonated esters and alkylbenzenesulfonates. In certain embodiments of the present invention, cationic and nonionic surfactants are preferred, as anionic corrosion inhibitors may tend to precipitate out of the acidic fluid at particularly low pH levels. It is within the ability of one skilled in the art, with the benefit of this disclosure, to determine if the acidic fluid supports an anionic inhibitor. In some embodiments of the present invention, a surfactant may be used from about 1% of the volume of the esterquat to about 100% of the volume of the esterquat, preferably from about 10% to about 40%.

Some methods and compositions of the present invention comprise combining suitable esterquats with a solvent that may act, inter alia, to disperse the esterquat throughout the acidic treatment fluid. Any solvent compatible with the esterquat may be used in conjunction with the compositions and methods of the present invention. Suitable solvents include, but are not limited to, water; an alcohol such as methyl alcohol, ethanol, propanol, 2-ethyl-1-hexanol; a glycol such as ethylene glycol, propylene glycol, diethylene glycol, dipropylene glycol; a glycol ether such as ethylene glycol monomethyl ether, ethylene glycol monobutyl ether, diethylene glycol monomethyl ether, diethylene glycol monobutyl ether, propylene glycol monomethyl ether; and combinations thereof. In some embodiments of the present invention, a solvent may be used from about 1% of the volume of the esterquat to about 100% of the volume of the esterquat, preferably from about 10% to about 40%.

Esterquats of the present invention may be used, either independently or as part of a blend, to at least partially inhibit metal corrosion in acidic environments. It is believed that the esterquats, inter alia, provide a protective layer between the metal surface and the acidic fluid. In the methods of the present invention wherein the esterquats are used to impart corrosion inhibition, optionally it may be useful to combine them with one or more traditional corrosion inhibitors. Suitable such traditional corrosion inhibitors include, but are not limited to, cinnamaldehyde, acetylenic alcohols, fluorinated surfactants, quaternary derivatives of heterocyclic nitrogen bases, condensation products of a carbonyl-containing compound, a nitrogen-containing compound and an aldehyde, formamides, surface active agents, solvents, and combinations of such compounds. Where using a blend of inhibitors including a traditional corrosion inhibitor, it may be further useful to include an iodine-containing compound in the blend. When not used as part of a blend, the esterquat will generally be present in the acidic treatment fluid in an amount of less than about 5% of the total acid fluid volume, preferably of less than about 3%. When used as part of a corrosion inhibiting blend (i.e. a blend comprising one or more esterquats of the present invention and one or more traditional corrosion inhibitors) the total blend will generally be present in an amount of less than about 5% of the total acid volume, preferably of less than about 3%. The esterquat generally comprises from about 1% to about 99% of the corrosion inhibiting blend.

In addition to their use in inhibiting corrosion, the compositions of the present invention that comprise esterquats also may be used to inhibit sludging, to inhibit the formation of emulsions, and to reduce the presence of formed emulsions. In such applications, it is believed that the esterquats act, inter alia, to coat asphaltene surfaces within the formation and provide a protective layer between the asphaltene and the acid fluid. The esterquat generally will be present in an amount of less than about 5% of the total acid fluid volume, preferably of less than about 3%. In certain embodiments, where an esterquat of the present invention is used to both inhibit metal corrosion and to inhibit sludge formation, the volume percent needed is not cumulative; that is, even when used to perform both functions, the esterquat will generally be present in an amount of less than about 5% of the total acid fluid volume.

In a further embodiment of the present invention where a composition of the present invention is used to inhibit sludging, the acidic treatment fluid also may comprise an aromatic hydrocarbon compound that exhibits suitably high oil-wetting characteristics. Suitable aromatic hydrocarbons, include, but are not limited to, xylenes, saturated biphenyl-xylenes admixtures, heavy aromatic naphthas, heavy aromatic solvents, tetralenes, tetrahydroquinolines, tetrahydronaphthalenes, and combinations thereof. When used, the aromatic hydrocarbon compound is preferably included in the compositions of the present invention in an amount sufficient to enhance penetration and "wetting" of all oleaginous/non-oleaginous interfaces during a subterranean treatment. In some embodiments of the present invention, the aromatic hydrocarbon may be included in an amount of from about 1% to about 200% of the volume of the esterquat in the acidic treatment fluid, preferably from about 40% to about 100%.

In the present invention, the acid fluid in the acidic treatment fluid may comprise organic acids, inorganic acids, or combinations thereof. Examples of suitable acids include, but are not limited, to hydrochloric acid, hydrofluoric acid, acetic acid, formic acid, hydroxyfluoboric acid, citric acid, EDTA, and combinations thereof. The acid fluids used in the methods of the present invention generally exhibit a pH of less than about 4. Persons having ordinary skill in the art, with the benefit of this disclosure, will recognize the amount and type of acid to use for a particular application, depending on the concentration of the acid, the formation composition, reservoir conditions, and the desired result.

In the acidic treatment fluids of the present invention, the esterquats may be combined with the acid fluid at almost any time throughout the life of a subterranean operation, depending on the desired effect. For example, in some embodiments, the esterquat and acid fluid may be combined to create an acidic treatment fluid before the acidic treatment fluid is introduced to the subterranean formation, inter alia, to stimulate production while inhibiting the corrosion of the metal structures and equipment, both in the well bore and at the surface. In other embodiments of the present invention, an esterquat may be added to an acid fluid already placed in a subterranean formation to form the acidic treatment fluid in situ. In some such embodiments, the composition comprising the esterquat may be added as a separate solution or even as a solid (e.g., in powder or pill form).

To facilitate a better understanding of the present invention, the following examples of some preferred embodiments are given. In no way should these examples be read to limit the scope of the invention.

EXAMPLE 1

Exemplary acidic treatment fluids comprising acid fluids and esterquats were prepared to test their sludging inhibition and emulsion inhibition characteristics. Exemplary comparative samples were also made, prepared, and similarly tested.

To create the an exemplary esterquat suitable for use in the present invention, a reverse esterquat, [bis(2-hydroxyethyl)coco betaine] cinnamyl alcohol esterquat, was prepared as follows: (1) an ester was prepared by combining 3.78 grams (0.04 moles) of chloroacetic acid, and 5.37 grams (0.04 moles) of cinnamyl alcohol and heating for forty minutes at 150° Fahrenheit; (2) the quaternary ammonium ester was prepared by charging 10.92 grams of bis(2-hydroxyethyl)cocoamine (commercially available under the tradename "ETHOMEEN (C/12)™," supplied by Akzo Nobel Chemicals, Inc., from The Woodlands, Tex.) to a 100 mL round bottom flask; (3) the ester from step 1, above, was then charged to the flask along with approximately 15 milliliters of isopropanol; (4) the mixture was refluxed for 2 hours, followed by distillation to remove the isopropanol.

To create another exemplary esterquat suitable for use in the present invention, a reverse esterquat, [bis(2-hydroxyethyl)coco betaine] glycerol reverse esterquat, was prepared as follows: (1) an ester was prepared by combining 1.5 grams (0.02 moles) of glycerol, and 3.78 grams (0.04 moles) of chloroacetic acid and heating for thirty minutes at 105° Fahrenheit; (2) the quaternary ammonium ester was prepared by charging 10.918 grams (0.04 moles) of bis(2-hydroxyethyl)cocoamine (commercially available under the tradename "ETHOMEEN (C/12)™," supplied by Akzo Nobel Chemicals, Inc., from The Woodlands, Tex.) to a 100 milliliter round bottom flask; (3) the ester from step 1, above, was then charged to the flask along with approximately 15 milliliters of isopropanol. The mixture was refluxed for 1 hour, followed by distillation to remove the isopropanol; (4) the resultant product was a mixture of mono-, di-, and triquaternary ammonium esterquats.

EXAMPLE 2—EMULSION INHIBITION

Exemplary acidic treatment fluids were prepared and introduced to hydrocarbon fluids, and their emulsion inhibition properties were determined. The acidic treatment fluids were prepared by mixing an acid fluid (15% HCl) with a [bis(2-hydroxyethyl)coco betaine] cinnamyl alcohol esterquat. The acidic treatment fluids were then placed in a marked glass jar, the samples were shaken to emulsify, and the emulsions were monitored at room temperature for separation of the oil and treatment fluid. Comparative samples were also made and similarly tested, comparative sample 1 comprised only the acid and hydrocarbon fluid, while comparative samples 2 & 3 further comprised a volume of a traditional corrosion inhibitor. The following sample treatment fluids were tested:

Comparative Sample No. 1: 50:50 by volume mixture of Canada crude oil and 15% HCl;

Comparative Sample No. 2: 50:50 by volume mixture of Canada crude oil and 15% HCl in addition to 1.5% by volume HAI-85M™ (a corrosion inhibitor commercially available from Halliburton Energy Services, Duncan, Okla.);

Comparative Sample No. 3: 50:50 by volume mixture of Canada crude oil and 15% HCl in addition to 1.5% by volume 19-N™ (a demulsifier commercially available from Halliburton Energy Services, Duncan Okla.);

Sample No. 4: 50:50 by volume mixture of Canada crude oil and 15% HCl in addition to 1.5% by volume [bis(2-hydroxyethyl)coco betaine] cinnamyl alcohol esterquat; and Sample No. 5: 50:50 by volume mixture of Canada crude oil and 15% HCl in addition to 0.75% by volume [bis(2-hydroxyethyl)coco betaine] cinnamyl alcohol esterquat.

Table 1 below lists the percentage emulsion break over time:

TABLE 1

| Sample description | % Break | | |
| --- | --- | --- | --- |
| | 1 min. | 3 min. | 5 min. |
| Comparative Sample No. 1 | — | — | 100 |
| Comparative Sample No. 2 | — | — | 0 |
| Comparative Sample No. 3 | — | — | 10 |
| Sample No. 4 | 80 | 80 | 80 |
| Sample No. 5 | — | 100 | 100 |

The above example demonstrates, inter alia, that the acidic treatment fluids comprising esterquats of the present invention inhibit and reduce emulsions.

EXAMPLE 3—EMULSION INHIBITION

Exemplary acidic treatment fluids were prepared and introduced to hydrocarbon fluids, and their emulsion inhibition properties were determined. The acidic treatment fluids of the present invention were prepared by mixing a hydrocarbon fluid with an acid fluid (15% HCl) with an esterquat (sample 4) or a blend comprising an esterquat (sample 3). The acidic treatment fluids were then placed in a marked glass jar, the samples were shaken to emulsify, and the emulsions were monitored at room temperature for separation of the oil and treatment fluid. Comparative samples were also made and similarly tested. Comparative sample 1 comprised only the acid and hydrocarbon fluid, while comparative sample 2 further comprised a volume of a traditional corrosion inhibitor. The following sample treatment fluids were tested:

Comparative Sample No. 1: 50:50 by volume mixture of Mexican crude oil and 15% HCl;

Comparative Sample No. 2: 50:50 by volume mixture of Mexican crude oil and 15% HCl in addition to 1.5% by volume HAI-85M™ (a corrosion inhibitor commercially available from Halliburton Energy Services, Duncan, Okla.); and Sample No. 3: 50:50 by volume mixture of Mexican crude oil and 15% HCl in addition to 1.5% by volume corrosion inhibitor blend (0.4 grams of sodium iodide, 4.48 grams of propylene glycol, 0.81 grams of 2-ethyl-1-hexanol, 2.9 grams of [bis(2-hydroxyethyl)coco betaine] cinnamyl alcohol esterquat, 1.13 grams of ethoxylated naphthenic acid (18–20 mol EO), 0.28 grams of ETHAL LA-23 (a surfactant commercially available form Ethox Chemicals, Greenville, S.C.) combined and heated for fifteen minutes at 150° Fahrenheit);

Sample No. 4: 50:50 by volume mixture of Mexican crude oil and 15% HCl in addition to 1% by volume "ARMOCARE®" VGH-70 (a 70% active normal esterquat commercially available from by Akzo Nobel Chemicals, Inc., from The Woodlands, Tex.).

Table 2 below lists the percentage emulsion break over time:

TABLE 2

| Sample description | % Break | |
| --- | --- | --- |
| | 5 min. | 10 min. |
| Comparative Sample No. 1 | — | 0 |
| Comparative Sample No. 2 | — | 0 |
| Sample No.3 | — | 80 |
| Sample No.4 | 10 | 20 |

The above example demonstrates, inter alia, that the treatment fluids of the present invention inhibit and reduce emulsions.

EXAMPLE 4—EMULSION INHIBITION

A test sample of an acidic treatment fluids comprising [bis(2-hydroxyethyl)coco betaine] glycerol esterquat and a blend of 12% acetic acid and 10% formic acid was prepared and combined with a hydrocarbon fluid and the emulsion inhibition properties were determined. A comparative sample containing only a hydrocarbon fluid and a blend of 12% acetic acid and 10% formic acid was also made and similarly tested. Both test mixtures were mixed in a marked glass jar and shaken to emulsify, and the emulsions were monitored at room temperature for separation of the oil and treatment fluid. The following sample treatment fluids were tested:

Comparative Sample No. 1: 50:50 by volume mixture of Canada crude oil and 12% acetic acid/10% formic acid blend; and Sample No. 2: 50:50 by volume mixture of Canada crude oil and 12% acetic acid/10% formic acid blend in addition to 1.5% by volume [bis(2-hydroxyethyl)coco betaine] glycerol esterquat.

Table 3 below lists the percentage emulsion break over time:

TABLE 3

| Sample description | % Break | | | |
| --- | --- | --- | --- | --- |
| | 1 min. | 3 min. | 5 min. | 10 min. |
| Comparative Sample No. 1 | — | — | 100 | 100 |
| Sample No. 2 | 100 | 100 | 100 | 100 |

The above example demonstrates, inter alia, that the treatment fluids of the present invention inhibit and reduce emulsions.

EXAMPLE 5—DEMULSIFICATION CAPABILITIES

The following acidic treatment fluids of the present invention were formed: Samples 6 and 7 containing 15% HCl and [bis(2-hydroxyethyl)coco betaine] cinnamyl alcohol esterquat; Sample 8 containing 15% HCl and a blend containing 0.4 g of sodium iodide; 4.48 g of propylene glycol; 0.81 g of 2-ethyl-1-hexanol; 2.90 g of [bis(2-hydroxyethyl)coco betaine] cinnamyl alcohol esterquat; 1.13 g of ethoxylated naphthenic acid (18–20 mol EO); 0.28 g of ETHAL LA-23 surfactant (Ethox Chemicals, Greenville, S.C.) (wherein the 6 blend ingredients were mixed and heated for approximately 15 minutes at a temperature of 150° F.); and, Sample 9 containing 15% HCl and "ARMOCARE®" VGH-70 (a 70% active normal esterquat commercially available from by Akzo Nobel Chemicals, Inc., from The Woodlands, Tex.). Those acidic treatment fluids were combined in a 50:50 volume mixture of oil (either Canada crude or Mexico crude) in a marked glass jar. The mixture was shaken to emulsify and monitored over time, at room temperature, for separation of the oil and acid fluids.

The following Comparative Samples were also formed: Comparative Samples 1 and 2 containing only 15% HCl; Comparative Samples 3 and 4 containing 15% HCl and HAI-85M™ (a corrosion inhibitor commercially available from Halliburton Energy Services, Duncan, Okla.); and, Comparative Sample 6 containing 15% HCl and commercially available demulsifier 19-N (available from Halliburton Energy Services, Duncan, Okla.). Those comparative fluids were combined in a 50:50 volume mixture of oil (either Canada crude or Mexico crude) in a marked glass jar. The mixture was shaken to emulsify and monitored over time, at room temperature, for separation of the oil and acid fluids.

Table 4, below, shows that commercially available inhibitor HAI-85M™ (available from Halliburton Energy Services, Duncan, Okla.) locks the emulsion and the commercially available demulsifier 19-N (available from Halliburton Energy Services, Duncan, Okla.) breaks 10% in 5 minutes; whereas the [Bis(2-hydroxyethyl)coco betaine] cinnamyl alcohol esterquat breaks the emulsion 100% at 3 minutes using 0.75% by volume. Moreover, Table 4 shows that while Sample 8 containing a blend comprising an esterquat of the present invention, was able to achieve an 80% break at 10 minutes, commercially available traditional inhibitor HAI-85M™, was not able to achieve any break in that time.

TABLE 4

Break tests for 50:50 volume mix of oil/15% HCl

| Crude Oil | | Additive | % (v/v) | % Break 1 min. | 3 min. | 5 min. | 10 min. |
|---|---|---|---|---|---|---|---|
| Canada | Comparative Sample 1 | None | — | — | — | 100 | 100 |
| Mexico | Comparative Sample 2 | None | — | — | — | — | 0 |
| Canada | Comparative Sample 3 | HAI-85M | 1.5 | — | — | — | 0 |
| Mexico | Comparative Sample 4 | HAI-85M | 1.5 | — | — | — | 0 |
| Canada | Comparative Sample 5 | 19-N | 1.5 | — | — | 10 | — |
| Canada | Sample 6 | Esterquat | 1.5 | 80 | 80 | 80 | 80 |
| Canada | Sample 7 | Esterquat | 0.75 | — | 100 | 100 | 100 |
| Mexico | Sample 8 | Blend #1 | 1.5 | — | — | — | 80 |
| Mexico | Sample 9 | Armocare ® VGH-70* | 1.0 | — | — | 10 | 20 |

Table 5 shows the results of testing similar to that described above but in an organic acid environment. Comparative Sample 1 contained only and a blend of 12% acetic acid/10% formic acid and was mixed with a Canada crude, and Sample 2 contained a blend of 12% acetic acid/10% formic acid, Mexico crude, and a [bis(2-hydroxyethyl)coco betaine] cinnamyl alcohol esterquat. As can be seen in Table 5, below, the compositions of the present invention that comprise esterquats also are able to demulsify in an organic acid environment:

TABLE 5

Break tests for 50:50 volume mix of oil/ 12% acetic acid and 10% formic acid blend

| Crude Oil | | Additive | % (v/v) | % Break 1 min. | 3 min. | 5 min. | 10 min. |
|---|---|---|---|---|---|---|---|
| Canada | Comparative Sample 1 | None | — | — | — | 100 | 100 |
| Mexico | Sample 2 | Esterquat | 1.5 | 100 | 100 | 100 | 100 |

EXAMPLE 6—CORROSION INHIBITION

Test samples of acidic treatment fluids were prepared and the corrosion inhibition properties were determined. Weight loss tests were performed by placing a weighed N-80 coupon (surface area approximately 4.4 in$^2$) in 100 mL of the acid blend in an autoclave which is then pressurized to 1000 psi, and is then heated to test temperature. Following the test, the coupon was reweighed and the weight loss determined.

TABLE 6

Weight Loss Testing of Reverse Esterquats on N-80 Steel in 15% HCl at 225° F., 3 hours

| Blend | Corrosion Loss (lb/ft$^2$) |
|---|---|
| 55.8 mL H$_2$O, 44.2 mL 31.45% HCl | 0.436 |
| 53.3 mL H$_2$O, 44.2 mL 31.45% HCl 2.5 mL [Bis(2-hydroxyethyl)coco betaine]glycerol esterquat | 0.231 |
| 53.3 mL H$_2$O, 44.2 mL 31.45% HCl 2.5 mL % [Bis(2-hydroxyethyl)coco betaine]cinnamyl alcohol esterquat | 0.080 |
| 53.3 mL H$_2$O, | 0.023 |

TABLE 6-continued

Weight Loss Testing of Reverse Esterquats on
N-80 Steel in 15% HCl at 225° F., 3 hours

| Blend | Corrosion Loss (lb/ft$^2$) |
|---|---|
| 44.2 mL 31.45% HCl<br>2.5 mL Blend #1<br>53.3 mL H$_2$O,<br>44.2 mL 31.45% HCl<br>2.5 mL Blend #2 | 0.066 |

Wherein "Blend #1" was formed by taking the following compounds and heating them for approximately 15 minutes at a temperature of 150° F.:
- 0.4 g of sodium iodide
- 4.48 g of propylene glycol
- 0.81 g of 2-ethyl-1-hexanol
- 2.90 g of [bis(2-hydroxyethyl)coco betaine] cinnamyl alcohol esterquat
- 1.13 g of ethoxylated naphthenic acid (18–20 mol EO)
- 0.28 g of ETHAL LA-23 surfactant (Ethox Chemicals, Greenville, S.C.)

And wherein "Blend #2" was formed by taking the following compounds and heating them for approximately 15 minutes at a temperature of 150° F.:
- 4.48 g propylene glycol
- 1.21 g 2-ethyl-1-hexanol
- 2.90 g [bis(2-hydroxyethyl)coco betaine] cinnamyl alcohol esterquat
- 1.13 g of ethoxylated naphthenic acid (18–20 mol EO)
- 0.28 g of ETHAL LA-23 surfactant As can be seen in Table 6, above, the compositions of the present invention that comprise esterquats are also capable of inhibiting metal corrosion.

Therefore, the present invention is well-adapted to carry out the objectives and attain the ends and advantages mentioned as well as those that are inherent therein. While numerous changes may be made by those skilled in the art, such changes are encompassed within the spirit and scope of this invention as defined by the appended claims.

What is claimed is:

1. A method of inhibiting metal corrosion during a subterranean treatment operation comprising:
   providing an acidic treatment fluid comprising an acidic fluid and at least one esterquat
   using the acidic treatment fluid in a subterranean treatment operation; and
   allowing at least one esterquat to at least partially inhibit metal corrosion.

2. The method of claim 1 wherein the esterquat is present in the acidic treatment fluid in an amount of about 5% or below based on the total volume of the acidic fluid.

3. The method of claim 1 wherein the esterquat comprises a normal esterquat having the general formula:

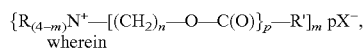
wherein

R represents a linear or branched chain saturated or unsaturated aliphatic hydrocarbon, aryl, arylalkyl, alkyl amide, hydroxy alkyl, or a mixture thereof, wherein, when there is more than one R group, they may be the same as one another or each may be different from one another;

m is an integer in the range from 1 to 3;

p is an integer of at least 1;

R' represents a linear or branched chain saturated or unsaturated aliphatic hydrocarbon, aryl, arylalkyl, alkyl amide, or a mixture thereof;

n is an integer in the range from 1 to 6; and

X$^-$ represents an anionic counter ion.

4. The method of claim 3 wherein R further comprises a substituent group selected from the group consisting of an aryl group, an alkoxy group, a hydroxyl group, an aryloxy group, an amido group, and a combination thereof.

5. The method of claim 3 wherein R' further comprises a substituent group selected from the group consisting of a hydroxyl group, a carbonyl group, an amido group, an aryl group, a sulfur and a combination thereof.

6. The method of claim 1 wherein the esterquat comprises a reverse esterquat having the general formula:

$\{R_{(4-m)}N^+\!-\![(CH_2)_n\!-\!C(O)\!-\!O]_p\!-\!R']_m\, pX^-,$
wherein

R represents a linear or branched chain saturated or unsaturated aliphatic hydrocarbon, aryl, arylalkyl, alkyl amide, hydroxy alkyl, or a mixture thereof, wherein, when there is more than one R group, they may be the same as one another or each may be different from one another;

m is an integer in the range from 1 to 3;

p is an integer of at least 1;

R' represents a linear or branched chain saturated or unsaturated aliphatic hydrocarbon, aryl, arylalkyl, alkyl amide, or a mixture thereof;

n is an integer in the range from 1 to 6; and

X$^-$ represents an anionic counter ion.

7. The method of claim 6 wherein R further comprises a substituent group selected from the group consisting of an aryl group, an alkoxy group, a hydroxyl group, an aryloxy group, an amido group, and a combination thereof.

8. The method of claim 6 wherein R' further comprises a substituent group selected from the group consisting of a hydroxyl group, a carbonyl group, an amido group, an aryl group, a sulfur, and a combination thereof.

9. The method of claim 1 wherein the acidic fluid exhibits a pH of less than about 6.

10. The method of claim 1 wherein the acidic fluid exhibits a pH of less than about 4.

11. The method of claim 1 wherein the acidic fluid is selected from the group consisting of hydrochloric acid, hydrofluoric acid, acetic acid, formic acid, hydroxyfluoboric acid, citric acid, EDTA, and a combination thereof.

12. The method of claim 1 wherein the acidic treatment fluid further comprises a surfactant.

13. The method of claim 12 wherein the acidic treatment fluid comprises a surfactant in an amount from about 1% of the volume of the esterquat to about 100% of the volume of the esterquat.

14. The method of claim 12 wherein the surfactant is a non-ionic surfactant selected from the group consisting of an alkyoxylate, an alkylphenol, an ethoxylated alkyl amine, an ethoxylated oleate, a tall oil, an ethoxylated fatty acid, and a combination thereof.

15. The method of claim 12 wherein the surfactant is a cationic surfactant selected from the group consisting of an alkylamine oxide, an alkylammonium salt, and a combination thereof.

16. The method of claim 12 wherein the surfactant is an anionic surfactant selected from the group consisting of an α-sulfonated ester, an alkylbenzenesulfonate, and a combination thereof.

17. The method of claim 1 wherein the acidic treatment fluid further comprises a solvent.

18. The method of claim 17 wherein the acidic treatment fluid comprises a solvent in an amount from about 1% of the volume of the esterquat to about 100% of the volume of the esterquat.

19. The method of claim 17 wherein the solvent is selected from the group consisting of water, an alcohol, a glycol, a glycol ether, and a combination thereof.

20. The method of claim 1 wherein the acidic treatment fluid further comprises an additional corrosion inhibitor.

21. The method of claim 20 wherein the corrosion inhibitor is selected from the group consisting of cinnamaldehyde, an acetylenic alcohol, a fluorinated surfactant, a quaternary derivative of a heterocyclic nitrogen base, a condensation product of a carbonyl-containing compound, a nitrogen-containing compound and an aldehyde, a formamide, a surface active agent, a solvent, and a combination thereof.

22. The method of claim 20 further comprising iodine.

23. The method of claim 1 wherein the esterquat included in the acidic treatment fluid has a physical form selected from the group consisting of a liquid, a solution, a solid, and a combination thereof.

* * * * *